United States Patent
Doon et al.

(10) Patent No.: US 12,137,435 B2
(45) Date of Patent: Nov. 5, 2024

(54) METHOD AND SYSTEM FOR MANAGEMENT OF BUFFERING TIME

(71) Applicant: Jio Platforms Limited, Ahmedabad (IN)

(72) Inventors: Abhishek Doon, Navi Mumbai (IN); Jitendra Soni, Navi Mumbai (IN); Gaurav Jain, Navi Mumbai (IN); Mukesh Singh, Dombivali (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 321 days.

(21) Appl. No.: 17/638,769

(22) PCT Filed: Aug. 26, 2020

(86) PCT No.: PCT/IB2020/057958
§ 371 (c)(1),
(2) Date: Feb. 25, 2022

(87) PCT Pub. No.: WO2021/038457
PCT Pub. Date: Mar. 4, 2021

(65) Prior Publication Data
US 2022/0330200 A1      Oct. 13, 2022

(30) Foreign Application Priority Data
Aug. 26, 2019   (IN) .............. 201921034302

(51) Int. Cl.
*H04W 4/70* (2018.01)
*H04L 49/90* (2022.01)
(Continued)

(52) U.S. Cl.
CPC .......... *H04W 68/005* (2013.01); *H04L 49/90* (2013.01); *G16Y 40/10* (2020.01)

(58) Field of Classification Search
CPC . H04W 68/005; H04W 28/0278; H04W 4/70; H04W 8/08; H04L 49/90; G16Y 40/10
See application file for complete search history.

(56) References Cited

U.S. PATENT DOCUMENTS 11,924,898 B2 *   3/2024   Kneckt ............... H04W 48/16
2008/0146253 A1 * 6/2008   Wentink ............. H04W 68/02
                                                    455/458

(Continued)

FOREIGN PATENT DOCUMENTS

WO      2018065060 A1    4/2018
WO      2021038457 A1    3/2021

OTHER PUBLICATIONS

International Search Report from International Appl. No. PCT/IB2020/057958, mailed Nov. 12, 2020.
(Continued)

*Primary Examiner* — Julio R Perez
(74) *Attorney, Agent, or Firm* — FINNEGAN, HENDERSON, FARABOW, GARRETT & DUNNER, LLP

(57) ABSTRACT

The present invention relates to a system and a method for managing communication between at least one NB-IoT device and an application server. The method comprises continuously receiving, at a mobility management unit, one or more data request from the application server for the at least one NB-IoT device. The mobility management unit transmits a paging request to the at least one NB-IoT device and dynamically monitors a response to the paging request from the at least one NB-IoT device. The mobility management unit continuously buffers the one or more data request based on the dynamic monitoring, and transmits, the one or more buffered data request based on one of an expiry of the paging request and the dynamic monitoring for managing (Continued)

communication between at least one NB-IoT device and the application server.

8 Claims, 3 Drawing Sheets

(51) Int. Cl.
*H04W 68/00* (2009.01)
*G16Y 40/10* (2020.01)

(56) References Cited

U.S. PATENT DOCUMENTS

| | | | |
|---|---|---|---|
| 2014/0220965 A1* | 8/2014 | Yang | H04W 24/02 |
| | | | 455/425 |
| 2018/0270188 A1* | 9/2018 | Kodaypak | H04L 63/0428 |
| 2019/0132900 A1* | 5/2019 | Hong | H04W 76/27 |
| 2020/0037380 A1* | 1/2020 | Qiu | H04W 68/12 |
| 2020/0245370 A1* | 7/2020 | Höglund | H04W 8/24 |
| 2022/0330200 A1* | 10/2022 | Doon | H04W 68/005 |
| 2022/0346060 A1* | 10/2022 | Kumar | H04W 68/005 |
| 2024/0074923 A1* | 3/2024 | Fajardo | A61F 13/505 |

OTHER PUBLICATIONS

Sakshi Popli et al., "A Survey on Energy Efficient Narrowband Internet of Things (NBioT): Architecture, Application and Challenges", IEEE Access (vol. 7), Nov. 15, 2018.

* cited by examiner

METHOD AND SYSTEM FOR MANAGEMENT OF BUFFERING TIME

This application is a national stage filing under 35 U.S.C. § 371 of International Application No. PCT/IB2020/057958, filed on Aug. 26, 2020, which claims the benefit of priority to Indian Application No. IN201921034302, filed on Aug. 26, 2019; the contents of these applications are each incorporated herein by reference.

FIELD OF INVENTION

The embodiments of the present invention generally relate to wireless communication networks, and more particularly relates to managing communication between at least one NB-IoT device and an application server.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In a traditional cellular deployment, suitable-powered macrocells are being deployed to cover sufficiently large areas. However, macro cells-only deployment suffers quick capacity degradation as the number of user equipments operating in the macro cell coverage areas increase. Therefore, telecom operators are reinforcing the macrocells deployment with one or more low powered small cellular cells (generally termed as Femto/Pico/Microcell) placed at multiple strategic locations within one or more macro coverage areas. The reinforced cellular network is termed as Heterogeneous network (HetNet). For a typical HetNet, strategic locations for small cells generally include areas with a high density of users, such as shopping malls, airports, railway/bus stations, colleges, etc. Also, the locations might include an area with dead-spots, or areas with low macro signal strength, such as indoor establishments or peripheral locations of a macro coverage area. Reinforced with small cells placed at multiple strategic locations as described above, HetNet provides increased mobile data capacity along with better mobile coverage, thereby enhancing the overall user's mobile broadband experience.

In the mobile communication network, it may often be difficult for the operators to cater high user throughput and to maintain acceptable signal quality throughout the homogeneous deployment of only macro base stations, especially in areas of high user density or with high building penetration loss. The small base station (or, small cell), when used along with macro base stations, serve the dual purpose of enhanced capacity and coverage as well as reduced capital expenditure and operating costs. The service operators are increasingly deploying small base stations in larger numbers to cater to the localized area of high user density e.g. offices, shopping complexes etc.

Recently, 3GPP has introduced a new technology NB-IoT in release 13 for low-end IoT applications with better performance than Low Power Wide Area technology (LPWA). The NB-IoT technology has been implemented in licensed bands of LTE. This technology makes use of a minimum system bandwidth of 180 kHz i.e. one PRB (Physical Resource Block) The NB-IoT can be deployed in 3 modes as described in the FIG. 2 below: "in-band", "guard band" and "standalone". In the "in-band" operation, resource blocks present within LTE carrier is used. The inner resource blocks are not used as they are allotted for synchronization of LTE signals. In "guard band" operation, resource blocks between LTE carriers that are not utilized by any operator are used. In "standalone" operation, GSM frequencies are used, or possibly unused LTE bands are used. Release 13 of 3GPP contains important refinements like discontinuous reception (eDRX) and power save mode. The PSM (Power Save Mode) ensures battery longevity in release 12 and is completed by eDRX for devices that need to receive data more frequently.

The NB-IoT technology addresses some of the key IoT requirements, for instance, the battery lifetime of the devices increases, improved network coverage, cost of the devices is reduced, multiplexing of devices met for capacity requirements, and supporting a massive number of devices. The NB-IoT technology support low power consumption, use of low-cost devices and provides excellent coverage.

For example, in an NB-IoT deployment, the NB-IoT cells have a 20 dB gain over other categories like CAT 4/3/1 cells. As such, the NB-IoT Carrier can support much larger areas when compared to a CAT 4/3/1 base station or channel. Typically, in NB-IOT scenario, the same base station provides the NB-IoT channels for a device. The same or a different base station can provide a channel for a CAT-1 or a CAT 3/4 operation due to the difference in the NB-IoT and other category cell coverage areas.

Another key benefit of NB-IoT devices includes energy optimization feature for operating the NB-IoT device on low-power consumption during a sleep mode as well as when the NB-IoT device is transmitting over the network. While other cellular technologies like LTE-M focus on saving power by sleeping and limiting their transmit time and frequency, the NB-IoT focus on its ability to sleep (with support for Extended Discontinuous Reception (eDRX)) and minimize power consumption during data transmission, primarily due to the simplified data transmission method and lower data rate, which reduces the need to do power-hungry signal processing and improves the overall efficiency of the system. Secondly, NB-IoT possesses less complex radio design with a single antenna and are, accordingly, less expensive than other cellular technologies, reducing the barrier to integrate low-power cellular technology into their solutions. And thirdly, NB-IoT also provides improved range and obstacle penetration. Along with its reduced data rates and simplified radio design, NB-IoT has stronger link budgets than other cellular technologies, leading to greater coverage and strong building penetration, great for applications with devices deployed in difficult to reach places.

Also, various attempts are made to apply 5G communication systems to IoT networks, for example, technologies such as a sensor network, Machine Type Communication (MTC), and Machine-to-Machine (M2M) communication. For instance, application of a cloud Radio Access Network (RAN) and big data processing technology may also be considered to be as an example of convergence between the 5G technology and the IoT technology. Meanwhile, an LTE system may determine whether to perform application-specific access barring and control accesses per application. However, the complicated application-specific access barring mechanism gives rise to the necessity of a consistent access control mechanism.

SUMMARY

This section is provided to introduce certain objects and aspects of the present invention in a simplified form that are further described below in the detailed description. This summary is not intended to identify the key features or the scope of the claimed subject matter.

In order to overcome at least a few problems associated with the known solutions as provided in the previous section, an object of the present invention is to provide a method and a system managing communication between at least one NB-IoT device and an application server. Another object of the present invention is to provide a method and a system for managing communication between at least one NB-IoT device and an application server when the at least one NB-IoT device does not respond to the paging request. Yet another object of the present invention is to provide a system and a method of improved communication between the at least one NB-IoT device and the application server such that no data packets are lost during the transmission.

In order to achieve the aforementioned objectives, the present invention provides a method and system for managing communication between at least one NB-IoT device and an application server. The method comprises continuously receiving, at a mobility management unit, one or more data request from the application server for the at least one NB-IoT device. Next, the mobility management unit transmits a paging request to the at least one NB-IoT device. Further, the mobility management unit dynamically monitors a response to the paging request from the at least one NB-IoT device. The method further involves continuously buffering, at the mobility management unit, the one or more data request based on the dynamic monitoring of the response to the paging request from the at least one NB-IoT device. Lastly, the mobility management unit transmits the one or more buffered data request based on one of an expiry of the paging request and the dynamic monitoring of the response to the paging request from the at least one NB-IoT device for managing communication between at least one NB-IoT device and the application server.

Another aspect of the present invention relates to a system for managing communication between at least one NB-IoT device and an application server, the system comprising the at least one application server configured to transmit one or more data request to the at least one NB-IoT device. The system further comprised a mobility management unit connected to the application server, said mobility management unit configured to continuously receive the one or more data request from the application server for the at least one NB-IoT device. The mobility management unit is further configured to transmit a paging request to the at least one NB-IoT device. dynamically monitor a response to the paging request from the at least one NB-IoT device. The mobility management unit is further configured to continuously buffer the one or more data request based on the dynamic monitoring of the response to the paging request from the at least one NB-IoT device. The mobility management unit is further configured to transmit the one or more buffered data request based on one of an expiry of the paging request and the dynamic monitoring of the response to the paging request from the at least one NB-IoT device for managing communication between at least one NB-IoT device and the application server.

DETAILED DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
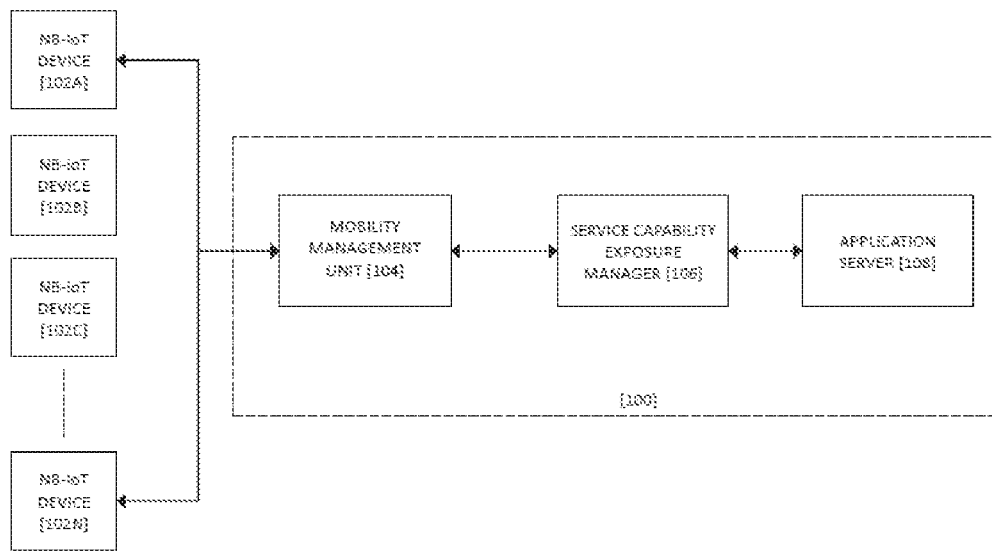
FIG. 1 illustrates an exemplary diagram of a system for managing communication between at least one NB-IoT device and an application server, in accordance with exemplary embodiments of the present invention.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "communication unit" or a "transceiver unit" may include at least one of a "transmitter unit" configured to transmit at least one data and/or signals to one or more destination and a "receiver unit" configured to receive at least one data and/or signals from one or more source. The "communication unit" or the "transceiver unit" may also be configured to process the at least one data and/or signal received or transmitted at the "communication unit" or the "transceiver unit". Also, the "communication unit" or the "transceiver unit" may further include, any other similar units obvious to a person skilled in the art, required to implement the features of the present invention.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor that comprises a memory and a processor. The memory is configured to store the modules and the processor is specifically configured to execute said modules to perform one or more processes which are described further below.

Hereinafter, exemplary embodiments of the present disclosure will be described in detail with reference to the accompanying drawings so that those skilled in the art can easily carry out the present disclosure.

Currently, when multiple mobile terminal downlink data (MT data) is present at the service capability exposure function (SCEF) almost at the same time due to the Application Server (AS) sending multiple Downlink Data, then SCEF sends all the MT Data in multiple mobile terminal data request (TDR) request towards the mobility management entity (MME), or virtualized mobility management entity (vMME) as the case may be, waiting to be delivered to the NB-IoT device. As soon as the first TDR reaches the MME, the MME starts paging the NB-IoT device. Meanwhile if second, third & so forth TDRs are received at the MME, the MME replace the latest TDR with the previous TDR. Accordingly, if the paging fails, the MME sends mobile terminal data answer (TDA_with error code that the user is unreachable (e.g., DIAMETER_ERROR_UNREACHABLE_USER) for the last TDR received, and the SCEF is unaware that the previous TDRs were also not delivered to the NB-IoT device. Therefore, in the current system, the major drawback is that the undelivered TDRs are lost and the SCEF is never made aware of the lost TDRs.

The present invention provides solution to the above mentioned problem of the current systems by providing a novel method and a system for managing communication between at least one NB-IoT device [102] and an application server. The present invention proposes that the MME on the contrary may buffer all the TDRs received post the first TDR until there is a paging response, and also provide relevant error code to the SCEF in case of paging failure. The conventional techniques do not provide an efficient way for managing the lost TDRs. Compared to such techniques, various methods and apparatus described herein facilitate to manage communication between the NB-IoT device and the application server by buffering the TDRs which were previously getting lost.

Referring to FIG. 1 illustrates an exemplary diagram of a system for managing communication between at least one NB-IoT device and an application server, in accordance with exemplary embodiments of the present invention. As shown in FIG. 1, the system [100] comprises an application server [108], a mobility management unit [104], a service capability exposure manager [106], all the connected are to each other and work in conjunction to achieve the objectives of the present invention. The system [100] is connected to at least one NB-IoT device [102A, 102B, 102C, . . . 102N, hereinafter collectively referred to as "102"].

The application server [108] is configured to transmit one or more data request to the at least one NB-IoT device [102]. For instance, the application server [108] is configured to transmit one or more downlink data to the at least one NB-IoT device [102]. The application server [108] is further connected to the service capability exposure manager [106] (also referred to as service capability exposure function (SCEF)). The application server [108] transmits the one or more data request to the service capability exposure manager [106] to be further transmitted to the at least one NB-IoT device [102]. The service capability exposure manager [106] is configured to process the one or more downlink data to generate the one or more data request The service capability exposure manager [106] is connected to the mobility management unit [104] (also referred to as mobility management entity (MME)), and the service capability exposure manager [106] is accordingly configured to transmit the one or more data request to the mobility management unit [104], wherein the one or more data request is to be further transmitted to the NB-IoT device [102].

The mobility management unit [104] is configured to continuously receive the one or more data request from the application server [108] for the at least one NB-IoT device [102]. The mobility management unit [104] is further configured to transmit a paging request to the at least one NB-IoT device [102]. In an instance of the present invention, the mobility management unit [104] transmits a paging request to the at least one NB-IoT device [102] upon receiving a first data request. Further, the mobility management unit [104] is further configured to dynamically monitor a response to the paging request from the at least one NB-IoT device [102].

The mobility management unit [104] is configured to continuously buffer the one or more data request based on the dynamic monitoring of the response to the paging request from the at least one NB-IoT device [102]. In an instance of the present invention, the mobility management unit [104] continuously buffers the one or more data request based on one of the expiry of the paging request and until the response is received from the at least one NB-IoT device [102] and the expiry of the paging request.

The mobility management unit [104] is configured to transmit the one or more buffered data request based on one of an expiry of the paging request and the dynamic monitoring of the response to the paging request from the at least one NB-IoT device [102] for managing communication between at least one NB-IoT device [102] and the application server [108]. In an instance, the mobility management unit [104] is further configured to transmit the one or more buffered data request to the application server [108] in an event the paging request expires. The present invention further encompasses that in an event the paging request expires, the mobility management unit [104] is further configured to attach an error report to the one or more buffered data request to generate one or more data answer, wherein the error report comprises of at least an error code, and to transmit the one or more data answer to the service capability exposure manager [106]. In another instance of the present invention, the mobility management unit [104] is further configured to transmit the one or more buffered data request to the at least one NB-IoT device [102] in an event the response to the paging request is received from the at least one NB-IoT device [102].

Figure 2:
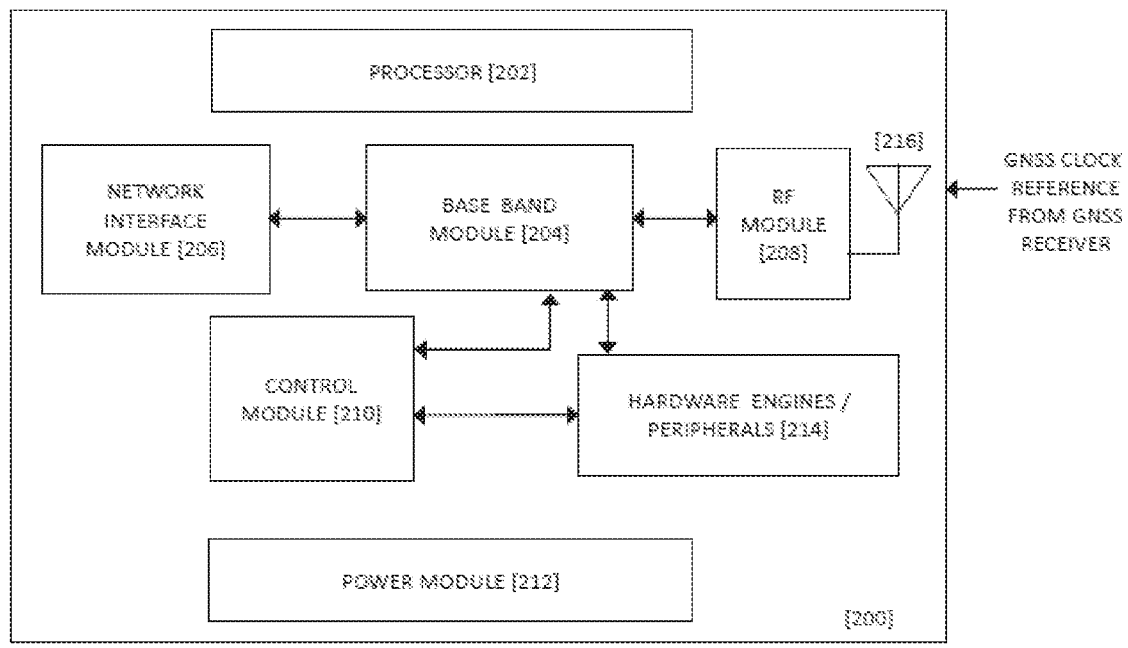
FIG. 2 illustrates an exemplary block diagram of an NB-IoT device, in accordance with exemplary embodiments of the present invention.

Referring to FIG. 2 illustrates an exemplary block diagram of an NB-IoT device, in accordance with exemplary embodiments of the present invention. The NB-IoT device [200] comprises a network interface module [206], a base band module [204], an RF module [208], an antenna [216], a control module [210], a plurality of hardware peripherals [214], a power module [212] and a processor [202]. The RF module [208] along with radio antenna [216] provides wireless access to the NB-IoT client devices according to the known NB-IoT protocols. The control module [210] is configured to manage and provision the NB-IOT wireless access points. The hardware peripherals [214] include, but are not limited to, encoders and decoders.

Figure 3:
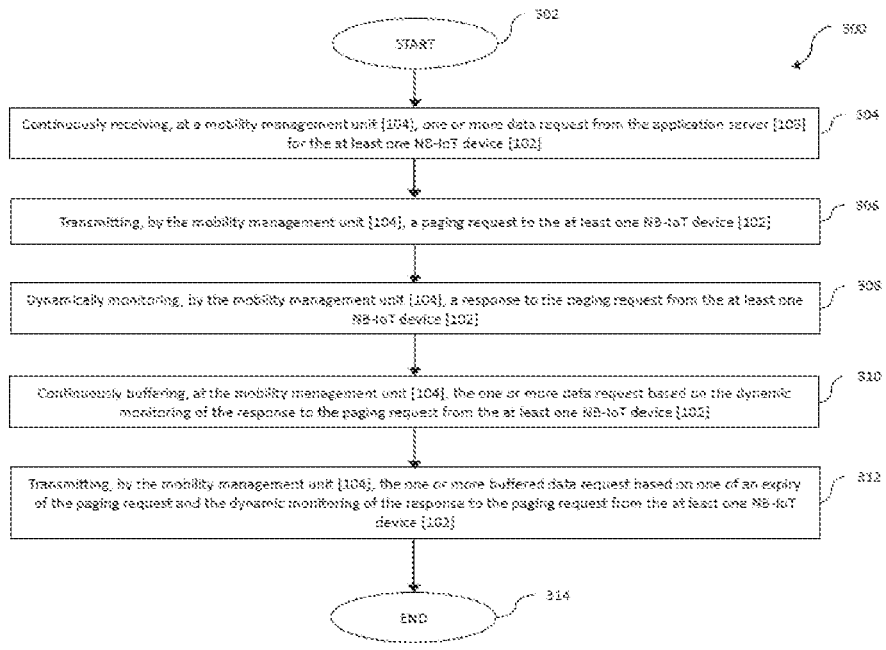
FIG. 3 illustrates an exemplary method flow diagram depicting a method for managing communication between at least one NB-IoT device and an application server, in accordance with exemplary embodiments of the present invention.

Referring to FIG. 3 illustrates an exemplary method flow diagram depicting a method for managing communication between at least one NB-IoT device [102] and an application server, in accordance with exemplary embodiments of the present invention. The method begins at step [302]. The method at step [304] comprises continuously receiving, at the mobility management unit [104], one or more data request from the application server [108] for the at least one NB-IoT device [102]. Next, at the step [306], the mobility management unit [104] transmits a paging request to the at least one NB-IoT device [102]. In an instance of the present invention, the mobility management unit [104] transmits a paging request to the at least one NB-IoT device [102] upon receiving a first data request. At step [308], the method comprises dynamically monitoring, by the mobility management unit [104], a response to the paging request from the at least one NB-IoT device [102].

Next, at step [310], the mobility management unit [104] continuously buffers the one or more data request based on the dynamic monitoring of the response to the paging request from the at least one NB-IoT device [102]. In an instance of the present invention, the mobility management unit [104] continuously buffers the one or more data request based on one of the expiry of the paging request and until the response is received from the at least one NB-IoT device [102] and the expiry of the paging request.

Lastly, at step [312], the mobility management unit [104] transmits the one or more buffered data request based on one of an expiry of the paging request and the dynamic monitoring of the response to the paging request from the at least one NB-IoT device [102] for managing communication between at least one NB-IoT device [102] and the application server [108]. In an instance, the mobility management unit [104] transmits the one or more buffered data request to the application server [108] in an event the paging request expires. In another instance of the present invention, the mobility management unit [104] is further configured to transmit the one or more buffered data request to the at least one NB-IoT device [102] in an event the response to the paging request is received from the at least one NB-IoT device [102]. The method completes at step [314].

The method of the present invention further encompasses that in an event the paging request expires, the mobility management unit [104] attaches an error report to the one or more buffered data request to generate one or more data answer, wherein the error report comprises of at least an error code, and to transmit the one or more data answer to the service capability exposure manager [106].

Figure 4:
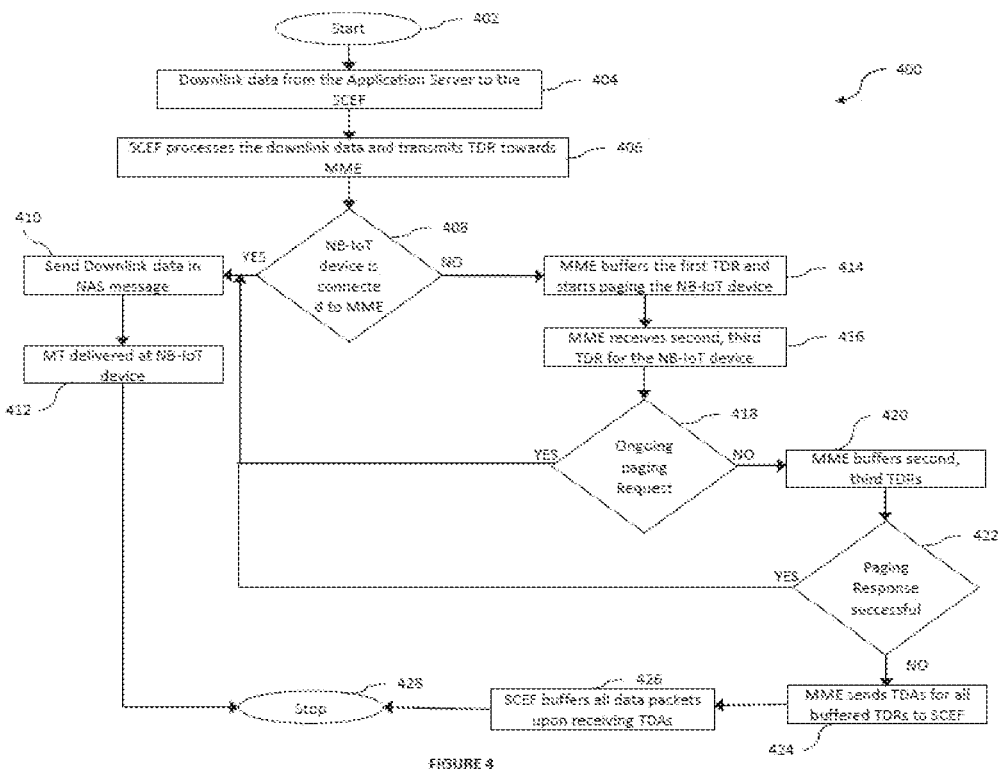
FIG. 4 illustrates an exemplary implementation flow diagram depicting method of managing communication between at least one NB-IoT device and an application server, in accordance with exemplary embodiments of the present invention.

Referring to FIG. 4 illustrates an exemplary implementation flow diagram depicting the method of managing communication between at least one NB-IoT device [102] and an application server [108], in accordance with exemplary embodiments of the present invention. The method starts at step [402]. At step [404], the method comprises receiving downlink data from the application server [108] at the SCEF [106]. Further, at step [406], SCEF [106] processes the downlink data and transmits at least one TDR (mobile terminal data request) towards MME [104]. Next, at step [408], the MME [104] receives the at least one TDR and determines whether NB-IoT device [102] is connected to MME. In event, the MME [104] is connected to the NB-IoT device [102], the MME [106] transmits downlink data in NAS message to the NB-IoT device [102] at step [410] and the NAS message is delivered at step [412], which completes the method. In an event, at step [414], the MME [104] is not connected to the NB-IoT device [102], the MME [106] buffers the first TDR and starts paging the NB-IoT device [102]. Simultaneously, at step [416], the MME [104] keeps receiving a second, a third TDR for the NB-IoT device [102].

At step [418], the MME [104] determines whether an ongoing paging request is active. In event, the MME [104] receives a response to the paging request and that the ongoing paging request is complete, the MME [106] transmits Downlink data in NAS message to the NB-IoT device [102] at step [410] and the NAS message is delivered at step [412], which completes the method. In another event, the MME [104] determines that the ongoing paging request is not complete and still pending a response from the NB-IoT device [102], the MME [104] buffers the second and third TDRs at step [420]. Also, the MME [104] also determines whether paging response is successful at step [422]. In event, the MME [104] receives a response to the paging request, the MME [106] transmits Downlink data in NAS message to the NB-IoT device [102] at step [410] and the NAS message is delivered at step [412], which completes the method. In event, the MME [104] receives no response to the paging request upon the expiry of the paging request, the MME [104] transmits mobile terminal data answer (TDAs) for all the buffered TDRs to the SCEF [106] at step [424]. The method also encompasses that the MME [104] attaches an error code for paging failure to the TDAs, for instance, the error code is DIAMETER_ERROR_USER_TEMPORARILY_UNREACHABLE (5653). At step [426], the SCEF [106] buffers all data packets corresponding to the received TDAs. The method completes at step [428].

Figure 5:
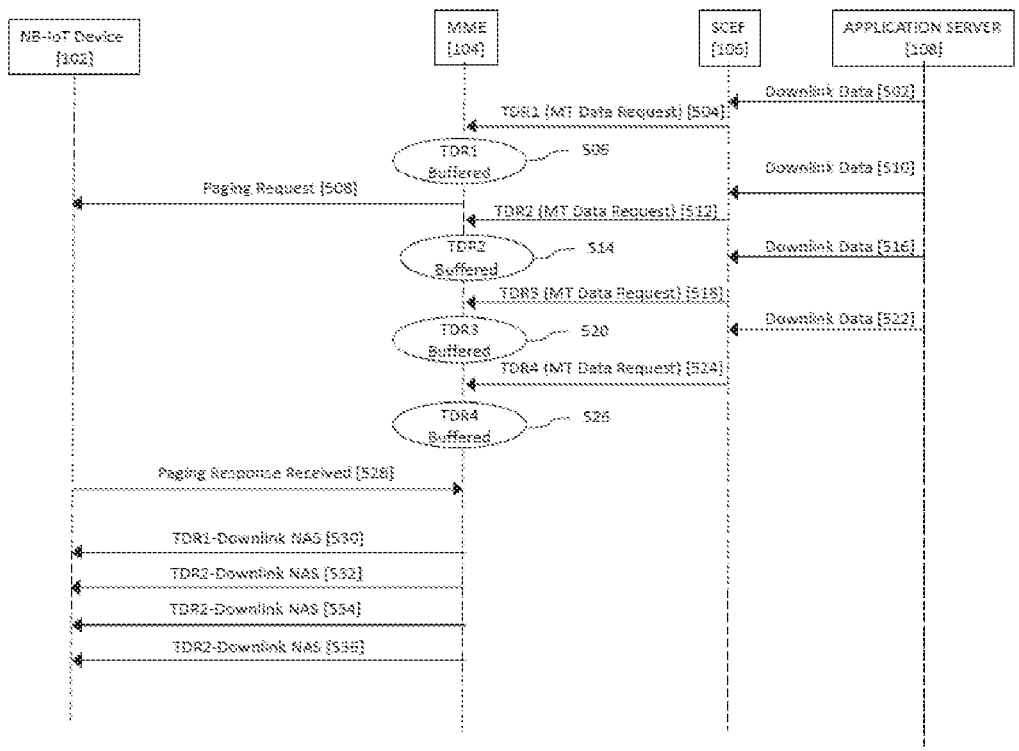
FIG. 5 illustrates an exemplary signal exchange between the at least one NB-IoT device, mobility management unit, service capability exposure manager and application server, in accordance with exemplary embodiments of the present invention.

Referring to FIG. 5 illustrates an exemplary signal exchange between the at least one NB-IoT device, mobility management unit, service capability exposure manager and application server, in accordance with exemplary embodiments of the present invention. The application server [108] starts sending downlink data [502, 510, 516, 522] to the SCEF [106]. The SCEF [106] receives the downlink data [502, 510, 516, 522] from the application server [108], and transmits a corresponding TDR [504, 512, 518, 524] for each of the packet of the download data [502, 510, 516, 522]. At the MME [104], upon receiving the first TDR [504], the MME [104] buffers [506] the first TDR [504] and sends a paging request [508] to the NB-IoT device [102]. Accordingly, until the MME [104] receives a successful paging response [528], the MME [104] buffers [514, 520, 526] the second, third and fourth TDRs. Upon receiving a successful paging response [528] from the NB-IoT device, the MME [104] transmits downlink NAS message for each of the TDRs [530, 532, 534, 536].

Figure 6:
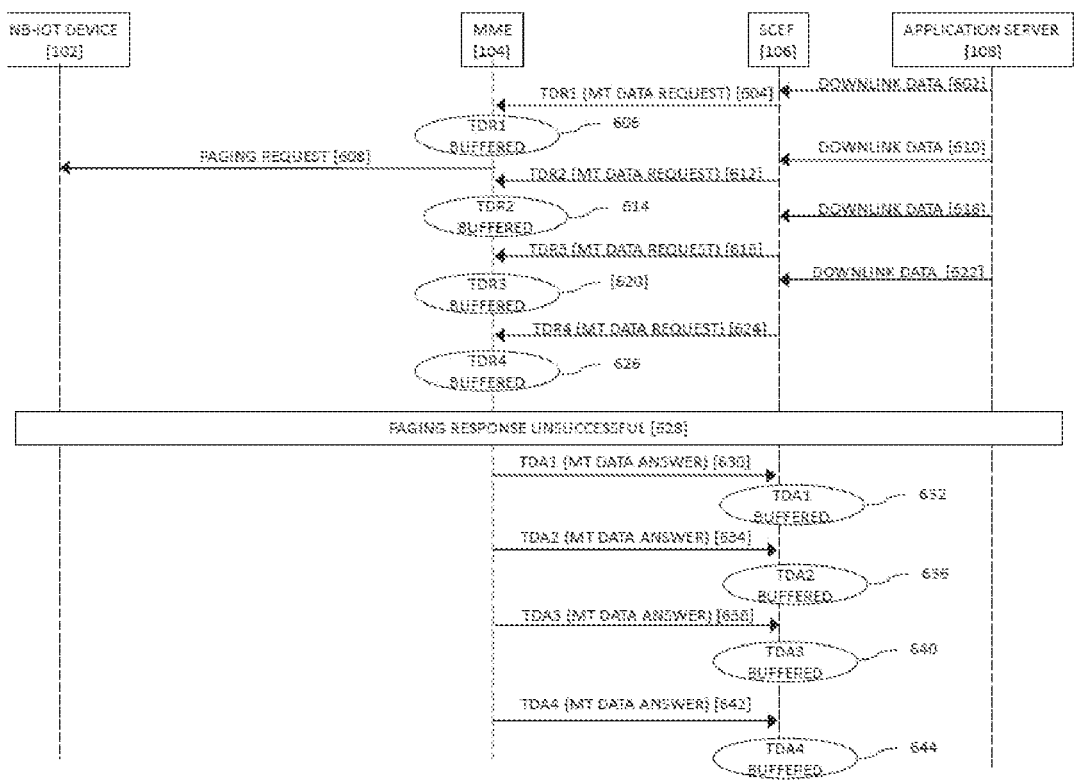
FIG. 6 illustrates an exemplary signal exchange between the at least one NB-IoT device, mobility management unit, service capability exposure manager and application server, in accordance with exemplary embodiments of the present invention.

Referring to FIG. 6 illustrates an exemplary signal exchange between the at least one NB-IoT device, mobility management unit, service capability exposure manager and application server, in accordance with exemplary embodiments of the present invention. The application server [108] starts sending downlink data [602, 610, 616, 622] to the SCEF [106]. The SCEF [106] receives the downlink data [602, 610, 616, 622] from the application server [108], and transmits a corresponding TDR [604, 612, 618, 624] for each of the packet of the download data [602, 610, 616, 622]. At the MME [104], upon receiving the first TDR [604], the MME [104] buffers [606] the first TDR [604] and sends a paging request [608] to the NB-IoT device [102]. Accordingly, the MME [104] detects whether a successful paging response [628] is received until expiry of the paging response. Meanwhile, the MME [104] buffers [614, 620, 626] the second, third and fourth TDRs. Upon expiry of the paging request (or paging request failure) [628], the MME [104] transmits TDAs [630, 634, 638, 642] each of the buffered TDRs. Accordingly, SCEF [106] buffers the downlink data [632, 636, 640, 644] for each of the received TDAs.

Thus, the present invention provides a novel solution of managing communication between the at least one NB-IoT device and the application server for the technical problem of lost data packets during the transmission of such data packets (e.g., downlink data) from the application server to the at least one NB-IoT device. Particularly, the solution of the present invention provides tracking the TDRs by the MME until a paging response is received from the NB-IoT device, and to send corresponding TDAs to the SCEF, thus, providing the technical effect that no data packets are lost during the transmission. By buffering each of the received TDR until there is a paging response, the present invention also provides identifying correct error code for each of the buffered TDR in case of paging failure, thus the technical advancement of the present invention is that the SCEF is made aware of the undelivered data packets along with the correct error cause for such undelivered data packets. While the present invention has been described with regard to an NB-IoT ecosystem, the present invention also encompasses that the system and method of the present invention can also be applied in the Long-Term Evolution Machine Type Communications Category M1 (LTE MTC Cat M1, also referred to as LTE-M) and 5G-Evolved Machine Type Communications (eMTC) and any other such communication known to person skilled in the art all of which are encompassed by the present application.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for managing communication between at least one NB-IoT device and an application server, the method comprising:
    continuously receiving, at a mobility management unit, one or more data request from the application server for the at least one NB-IoT device;
    transmitting, by the mobility management unit, a paging request to the at least one NB-IoT device;
    dynamically monitoring, by the mobility management unit, a response to the paging request from the at least one NB-IoT device;
    continuously buffering, at the mobility management unit, the one or more data request based on the dynamic monitoring of the response to the paging request from the at least one NB-IoT device;
    transmitting, by the mobility management unit, the one or more buffered data request based on one of: an expiry of the paging request, and the dynamic monitoring of the response to the paging request from the at least one NB-IoT device for managing communication between the at least one NB-IoT device and the application server;
    transmitting, by the mobility management unit, the one or more buffered data request to the application server in an event of the expiry of the paging request; and
    transmitting, by the mobility management unit, the one or more buffered data request to the at least one NB-IoT device in an event the response to the paging request is received from the at least one NB-IoT device.

2. The method as claimed in claim 1, further comprising:
    receiving, at a service capability exposure manager, one or more downlink data from the application server;
    processing, by the service capability exposure manager, the one or more downlink data to generate the one or more data request; and
    transmitting, by the service capability exposure manager, the one or more data request to the mobility management unit, wherein the one or more data request is to be further transmitted to the at least one NB-IoT device.

3. The method as claimed in claim 1, wherein:
    the mobility management unit transmits the paging request to the at least one NB-IoT device upon receiving a first data request; and
    the mobility management unit continuously buffers the one or more data request based on one of the expiry of the paging request, and until the response is received from the at least one NB-IoT device and the expiry of the paging request.

4. The method as claimed in claim 1, wherein in an event the paging request expires, the method further comprises:
    attaching, by the mobility management unit, an error report to the one or more buffered data request to generate one or more data answer, wherein the error report comprises at least an error code; and
    transmitting, by the mobility management unit, the one or more data answer to a service capability exposure manager.

5. A system for managing communication between at least one NB-IoT device and an application server, the system comprising:
    the at least one application server configured to transmit one or more data request to the at least one NB-IoT device;
    a mobility management unit connected to the application server, said mobility management unit configured to:
        continuously receive the one or more data request from the application server for the at least one NB-IoT device,
        transmit a paging request to the at least one NB-IoT device,
        dynamically monitor a response to the paging request from the at least one NB-IoT device,
        continuously buffer the one or more data request based on the dynamic monitoring of the response to the paging request from the at least one NB-IoT device,
        transmit the one or more buffered data request based on one of; an expiry of the paging request, and the dynamic monitoring of the response to the paging request from the at least one NB-IoT device for managing communication between the at least one NB-IoT device and the application server,
        transmit the one or more buffered data request to the application server in an event of the expiry of the paging request, and
        transmit the one or more buffered data request to the at least one NB-IoT device in an event the response to the paging request is received from the at least one NB-IoT device.

6. The system as claimed in claim 5, the system further comprising a service capability exposure manager connected to the mobility management unit and the application server, said service capability exposure manager configured to:
    receive one or more downlink data from the application server,
    process the one or more downlink data to generate the one or more data request, and
    transmit the one or more data request to the mobility management unit, wherein the one or more data request is to be further transmitted to the at least one NB-IoT device.

7. The system as claimed in claim 5, wherein the mobility management unit is further configured to:

transmit the paging request to the at least one NB-IoT device upon receiving a first data request; and continuously buffer the one or more data request based on one of the expiry of the paging request, and until the response is received from the at least one NB-IoT device and the expiry of the paging request.

8. The system as claimed in claim 5, wherein in an event the paging request expires, the mobility management unit is further configured to:

attach an error report to the one or more buffered data request to generate one or more data answer, wherein the error report comprises at least an error code; and transmit the one or more data answer to a service capability exposure manager.

* * * * *